(12) United States Patent
Huang et al.

(10) Patent No.: US 10,849,054 B1
(45) Date of Patent: Nov. 24, 2020

(54) SYSTEMS AND METHODS FOR DETECTING AND REMEDIATING EXCESSIVE MESSAGING BY WIRELESS TELECOMMUNICATIONS DEVICES

(71) Applicant: Verizon Patent and Licensing Inc., Arlington, VA (US)

(72) Inventors: Ye Huang, San Ramon, CA (US); Shelly E. Asher, Pittsburgh, CA (US); Jude M. Munn, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/418,198

(22) Filed: May 21, 2019

(51) Int. Cl.
*H04L 12/26* (2006.01)
*H04W 48/16* (2009.01)
*H04W 68/00* (2009.01)
*H04W 88/02* (2009.01)

(52) U.S. Cl.
CPC ............ *H04W 48/16* (2013.01); *H04L 43/16* (2013.01); *H04W 68/005* (2013.01); *H04W 88/02* (2013.01)

(58) Field of Classification Search
CPC ... H04W 48/16; H04W 68/005; H04W 88/02; H04L 43/16
See application file for complete search history.

(56) References Cited

U.S. PATENT DOCUMENTS

| | | | |
|---|---|---|---|
| 10,331,677 B1 * | 6/2019 | Horowitz | G06F 16/5846 |
| 2006/0154680 A1 * | 7/2006 | Kroth | H04W 74/004 455/515 |
| 2014/0126469 A1 * | 5/2014 | Youtz | H04W 48/02 370/328 |
| 2018/0027404 A1 * | 1/2018 | Delos Reyes | H04L 43/106 455/456.5 |

* cited by examiner

*Primary Examiner* — Fahmida S Chowdhury

(57) ABSTRACT

A system described herein may provide a technique for automatically mitigating excessive pings transmitted by a User Equipment ("UE") through a wireless telecommunications network by instructing the UE to take remedial action and/or by modifying the UE's access to the network. A given UE transmitting excessive pings may be automatically identified based on dynamic thresholds which may vary based on factors such as network congestion, and the instructions may include instructions to shut down, restart, or send fewer pings. The access may be modified by modifying subscription information for the UE at a subscriber information repository.

20 Claims, 8 Drawing Sheets

US 10,849,054 B1

SYSTEMS AND METHODS FOR DETECTING AND REMEDIATING EXCESSIVE MESSAGING BY WIRELESS TELECOMMUNICATIONS DEVICES

BACKGROUND

Wireless telecommunication networks provide network connectivity to a variety of user equipment ("UE"), such as mobile telephones, Internet of Things ("IoT") devices, or other wireless communication devices. In some situations, UEs may send messages, or "pings," (e.g., paging messages, "keep-alive" messages, and/or other types of similar communications) to the wireless telecommunication service network.

DETAILED DESCRIPTION OF THE PREFERRED EMBODIMENTS

The following detailed description refers to the accompanying drawings. The same reference numbers in different drawings may identify the same or similar elements.

Wireless telecommunications networks may communicate with various sources, including UEs such as mobile telephones, IoT devices, and/or other devices. The growing quantity of such devices utilizing a wireless telecommunications network may increase network utilization and/or congestion, which may result in a degradation of service for subscribers of the wireless telecommunications network. For example, UEs (e.g., mobile telephones, IoT devices, etc.) may sporadically communicate with the wireless telecommunications network, such as sending paging messages, keep-alive messages, relatively small or short bursts of information (e.g., an intermittent message with a sensor reading taken by an IoT device), or the like (referred to herein as "pings"). Excessive pings may cause network congestion and/or other issues. Embodiments described herein may automatically detect UEs that excessively ping the wireless telecommunications network, and may further automatically take remedial measures when excessive pings are detected from a UE. For instance, as described below, multiple types of messaging (e.g., control plane messaging and/or user plane messaging) may be used to request a UE to cease pinging excessively, and/or network-side enforcement may be implemented to reduce excessive pings from a UE (e.g., in circumstances where a UE does not satisfactorily remediate the excessive pinging in response to a request to cease pinging excessively).

Figure 1:
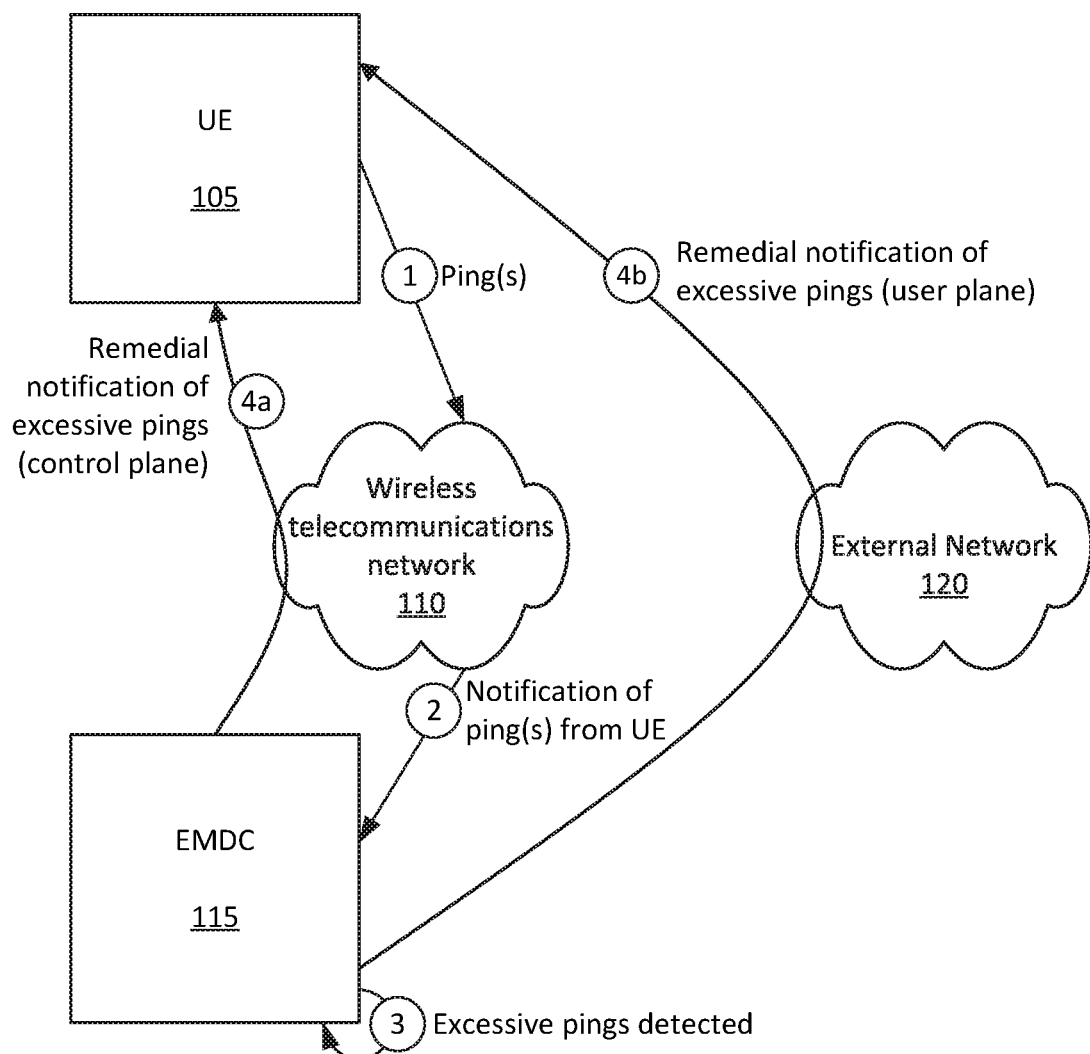
FIG. 1 illustrates an example overview of one or more embodiments described herein, in which excessive pings from a user equipment ("UE") may be detected and automatically remediated.

As shown in FIG. 1, for example, UE 105 may output (at 1) one or more messages, or "pings," to wireless telecommunications network 110. As mentioned above, the pings may be communications such as paging messages, keep-alive messages, connection requests, and/or other types of communications. Wireless telecommunications network 110 may notify (at 2) Excessive Message Detection Component ("EMDC") 115 of the pings from UE 105. As described below, EMDC 115 may be communicatively coupled with, and/or may be included in, wireless telecommunications network 110.

Based on these notifications, EMDC 115 may determine (at 3) whether UE 105 was, or is, communicating excessive pings to wireless telecommunications network 110. For example, EMDC 115 may make this determination (at 3) based on factors such as a quantity of pings (e.g., within a rolling time window, such as the quantity of pings within the last minute, the last hour, the last week, etc.), an amount of time between pings (e.g., where pings that are relatively closer together in time may be more indicative of "excessive" pings than pings that are spread over a greater duration of time), a current amount of load or congestion associated with wireless telecommunications network 110 (e.g., where a threshold for determining that the UE sends excessive pings may be lower when the network load is higher), and/or other factors. EMDC 115 may, for instance, determine that the pings from UE 105 are excessive when the quantity of pings from UE 105 exceed a predetermined threshold (e.g., greater than 20 pings in one minute, greater than 100 pings in one hour, or some other threshold). In some embodiments, the threshold may be dynamic, varying with current network congestion and/or other factors. For example, if wireless telecommunications network 110 is relatively congested (e.g., a measure of network load is relatively high), then the threshold for excessive pings may be lower. If, on the other hand, wireless telecommunications network 110 is relatively uncongested (e.g., a measure of network load is relatively low), then the threshold for excessive pings may be higher.

When excessive pings are detected (at 3), EMDC 115 may send one or more notifications, commands, or instructions to UE 105 (e.g., a request for UE 105 to reduce the quantity of pings sent by UE 105). For example, EMDC 115 may output (at 4a) a notification through wireless telecommunications network 110. The notification (at 4a) may, in some embodiments, include control plane messaging (e.g., as part of a Radio Resource Control ("RRC") message and/or some other type of control plane message). Additionally, or alternatively, EMDC 115 may output (at 4b) the notification via external network 120 (e.g., the Internet and/or some other network that is external to wireless telecommunications network 110) as a user plane message. In some embodiments, user plane messaging may be sent via wireless telecommunications network 110 (e.g., as a Short Message Service ("SMS") message, a Multimedia Service ("MMS")

message, and/or some other suitable message). The notification may indicate that UE 105 has sent excessive pings, and/or may include an instruction or command for UE 105 to decrease the number of pings, increase the timing between pings, shut down, restart, and/or perform some other remedial measure.

In some embodiments, the requested remediation may be in accordance with the detected excessive pings (at 3). For instance, if EMDC 115 determined (at 3) that UE 105 has outputted pings too frequently (e.g., a relatively short amount of time between pings, such that an average or median time between some or all of the pings is below a threshold amount of time), then EMDC 115 may request that UE 105 take remedial measures to increase the time between pings (e.g., buffering pings for a given amount of time before outputting pings). As another example, if EMDC 115 determined (at 3) that UE has outputted too many pings (e.g., greater than a threshold quantity of pings in a given time window), then EMDC 115 may request that UE 105 take remedial measures to reduce the quantity of pings over time (e.g., cease sending pings for a given amount of time, cease sending certain types of pings, etc.). In some scenarios, UE 105 may take remedial measures based on the notification (sent at 4a or 4b), thus eliminating or alleviating the excessive pings detected (at 3) by EMDC 115. In some embodiments, the notification may include a notification that is presented to a user of UE 105 (e.g., a message requesting that the user power down and/or restart UE 105), based on which the user may take a remedial measure indicated in the notification (e.g., may power down or restart UE 105).

Figure 2:
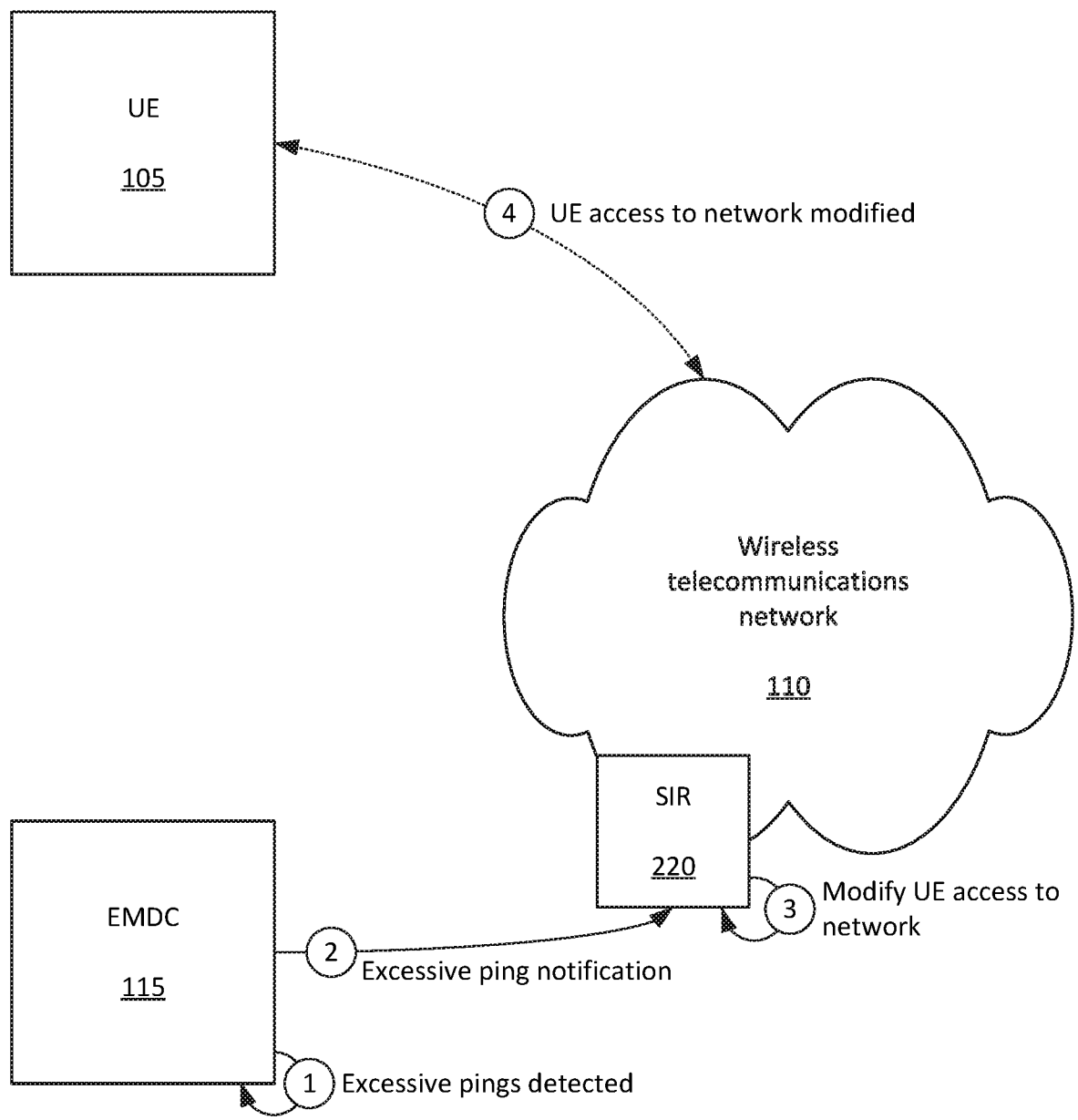
FIG. 2 illustrates an example overview of one or more embodiments described herein, in which excessive pings from a UE may be detected and automatically remediated.

FIG. 2 illustrates an embodiment in which the ability for UE 105 to access to wireless telecommunications network 110 may be modified based on excessive pings. As shown in FIG. 2, EMDC 115 may detect excessive pings (at 1) from the UE 105. Based on detecting the excessive pings, EMDC 115 may output (at 2) a notification to Subscriber Information Repository ("SIR") 220, indicating that excessive pings were detected from UE 105. As described below, SIR 220 may include a device (or devices) that are part of, and/or communicatively coupled with, wireless telecommunications network 110, and stores information that is used to determine whether UE 105 can access wireless telecommunications network 110 (and/or a level of access to wireless telecommunications network 110).

As discussed below, in some embodiments, EMDC 115 may output (at 2) this notification to SIR 220 after UE 105 continues to output excessive pings after EMDC 115 has requested UE 105 to cease or reduce pinging (e.g., in accordance with the example shown in FIG. 1). In some embodiments, EMDC 115 may output (at 2) this notification concurrently with, or independently of, requesting UE 105 to cease or reduce pinging.

In some embodiments, the notification from EMDC 115 (at 2) may include a request or instruction to modify access, to wireless telecommunications network 110, for UE 105 (e.g., to modify a subscription associated with UE 105). The modification may include suspension or termination of the subscription, and/or may indicate limits to impose on the access (e.g., limiting access for UE 105 to a certain time of day, limiting a data transfer speed for data sent to and/or received from UE 105, or the like).

In some embodiments, the notification sent to SIR 220 (at 2) may include instructions to include an annotation (or "flag") on a subscription associated with UE 105, to indicate that excessive pings from UE 105 have been detected. Additionally, or alternatively, SIR 220 may store annotations (or "flags") independently of whether EMDC 115 instructs SIR 220 to store flags when excessive pings are detected. In some embodiments, SIR 220 may modify the subscription differently based on whether the flags exceed certain thresholds. For example, SIR 220 may modify the subscription information based on a threshold for quantity of flags placed on the subscription associated with UE 105. If the number of flags exceeds a threshold amount, the subscription may be suspended for a period based on an escalating basis (e.g., one flag causes access to wireless telecommunications network 110 to be suspended for one hour, two flags cause access to wireless telecommunications network 110 to be suspended for one day, etc.). In some embodiments the threshold for the quantity of flags may be dynamic, varying with current network congestion and/or other factors. For example, if wireless telecommunications network 110 is relatively congested (e.g., a measure of network load is relatively high), then the threshold for the number of flags may be lower. If, on the other hand, wireless telecommunications network 110 is relatively uncongested (e.g., a measure of network load is relatively low), then the threshold for the number of flags may be higher.

The access of UE 105, to wireless telecommunications network 110, may be modified (at 4). For example, as mentioned above, restrictions may be placed by wireless telecommunications network 110 on access of UE 105 to wireless telecommunications network 110, which may include not responding to pings from UE 105, not allowing UE 105 to connect to wireless telecommunications network 110, restricting data transfer speeds, and/or other modifications to the access to wireless telecommunications network 110. In this manner, the cooperation of UE 105 (e.g., remediation of pings by UE 105) is not necessary, and the excessive pings can be remediated without relying on UE 105 to perform remedial measures.

Figure 3A:
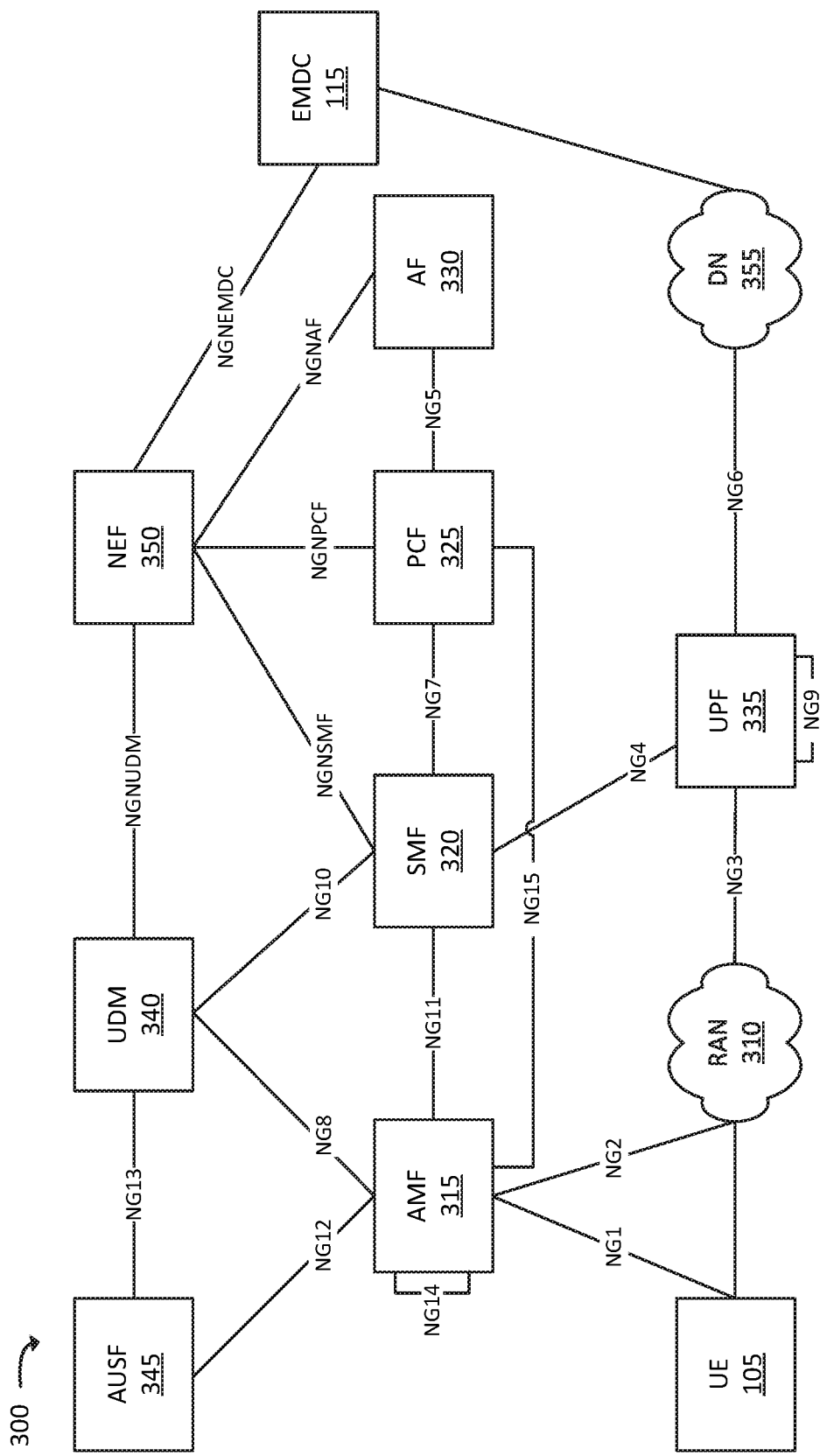
FIGS. 3A and 3B illustrate example environments in which one or more embodiments, described herein, may be implemented.
Figure 3B:
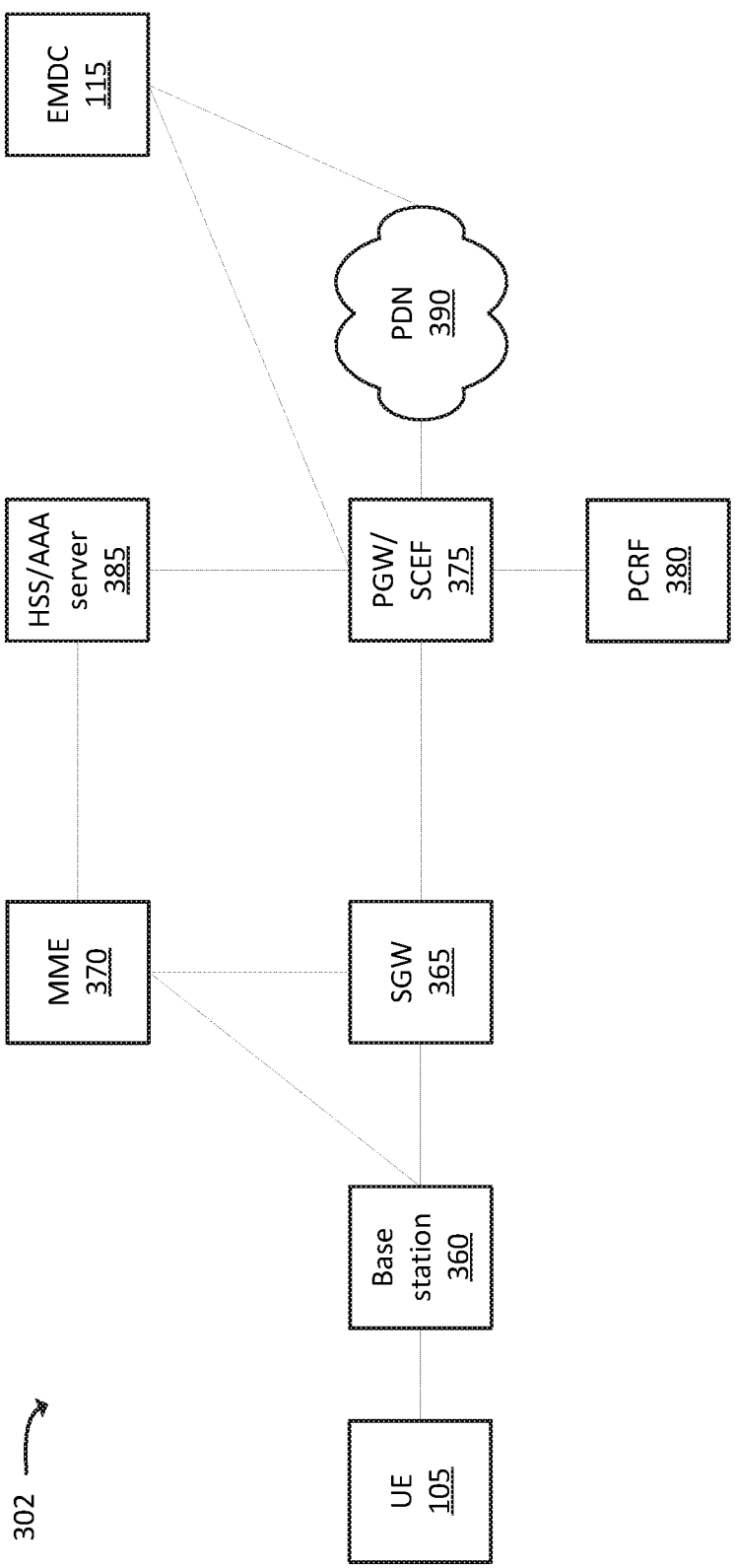

FIGS. 3A and 3B illustrate example environments 300 and 302, respectively, in which one or more embodiments may be implemented. Generally speaking, similar operations may be performed in environment 300 as in environment 302, in order to remediate excessive pings as described herein. In some embodiments, environment 300 may correspond to a Fifth Generation ("5G") network, and/or may include elements of a 5G network, and environment 302 may correspond to a Fourth Generation ("4G") network, and/or may include elements of a 4G network.

FIG. 3A depicts environment 300, which may include UE 105, EMDC 115, Radio Access Network ("RAN") 310, Access and Mobility Management Function ("AMF") 315, Session Management Function ("SMF") 320, Policy Control Function ("PCF") 325, Application Function ("AF") 330, User Plane Function ("UPF") 335, UDM 340, Authentication Server Function ("AUSF") 345, Network Exposure Function ("NEF") 350, and Data Network ("DN") 355.

The quantity of devices and/or networks, illustrated in FIG. 3A, is provided for explanatory purposes only. In practice, environment 300 may include additional devices and/or networks; fewer devices and/or networks; different devices and/or networks; or differently arranged devices and/or networks than illustrated in FIG. 3A. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 105 may include a computation and communication device, such as a wireless mobile communication device that is capable of communicating with RAN 310 and/or DN 355. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 105 may send traffic to and/or receive traffic from DN 355 via RAN 310 and UPF 335.

RAN 310 may be, or may include, a 5G RAN that includes one or more base stations, via which UE 105 may communicate with one or more other elements of environment 300. UE 105 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, AMF 315, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

In some embodiments, AMF 315 may provide control plane messaging to UE 105, which may include notifications or instructions in accordance with some embodiments described herein. For example, as discussed herein, AMF 315 may receive a notification or request from EMDC 115 when EMDC 115 detects excessive pings from UE 105, and may provide control plane messaging to UE 105 based on this notification or request.

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., quality of service parameters, charging parameters, or the like) for certain applications.

UPF 335 may include one or more devices that receive, store, and/or provide data (e.g., user plane data). For example, UPF 335 may receive user plane data (e.g., voice call traffic, data traffic, etc.), destined for UE 105, from DN 355, and may forward the user plane data toward UE 105 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 105 (e.g., via RAN 310, SMF 320, and/or one or more other devices), and may forward the traffic toward DN 355. In some embodiments, UPF 335 may communicate (e.g., via the NG4 interface) with SMF 320, regarding user plane data processed by UPF 335. As mentioned above, this information may aid SMF 320 in monitoring (e.g., tracking, counting, etc.) the traffic for particular subscribers.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

In some embodiments, UDM 340 and/or AUSF 345 may modify profile information based on notifications or requests received from EMDC 115 (e.g., via an interface between NEF 350 and UDM 340, shown in the figure as the "NGNUDM" interface). For instance, when EMDC 115 detects excessive pings from UE 105, EMDC 115 may provide a notification or request to UDM 340 and/or 345 to modify profile information based on the detected excessive pings, which may result in modified access to the network for UE 105.

NEF 350 may include one or more devices that allow portions of the 5G network to devices or systems that are external to the 5G network. For example, NEF 350 may be communicatively coupled to one or more devices of the 5G network (e.g., to UDM 340 via an NGNUDM interface, to SMF 320 via an NGNSMF interface, to PCF 325 via an NGNPCF interface, etc.). These devices may "expose" one or more functions via NEF 350, such as a function that allows control messages to be provided (e.g., to AMF 315 and/or SMF 320), a function that allows usage information (e.g., information that indicates a type and/or quantity of pings from UE 105) to be provided to devices or systems that are "external" to the 5G network, a function that allows subscriber information to be modified (e.g., at UDM 340). NEF 350 may also be communicatively coupled to one or more devices or systems that are "external" to the 5G network, such as AF 330 and/or EMDC 115, and/or other functions. Through NEF 350, these external devices may make use of functionality exposed via NEF 350, in accordance with embodiments described herein.

EMDC 115 may include one or more devices that perform one or more functions described herein. For example, EMDC 115 may receive information indicating a quantity and/or type of pings from UE 105 (e.g., from AMF 315 and/or SMF 320 via NEF 350), may detect excessive pings, and take remedial measures (e.g., send control plane messaging via AMF 315 and/or SMF 320; and/or user plane messaging via UPF 335 and/or DN 355).

DN 355 may include one or more wired and/or wireless networks. For example, DN 355 may include an IP-based PDN, a wide area network ("WAN") such as the Internet, a private enterprise network, and/or one or more other networks. UE 105 may communicate, through DN 355, with data servers, other UEs 105, and/or to other servers or applications that are coupled to DN 355. DN 355 may be connected to one or more other networks, such as a public switched telephone network ("PSTN"), a public land mobile network ("PLMN"), and/or another network. DN 355 may be connected to one or more devices, such as content providers, applications, web servers, and/or other devices, with which UE 105 may communicate.

Environment 302, shown in FIG. 3B, may include an evolved packet system ("EPS") that includes a Long-Term Evolution ("LTE") RAN and/or an Evolved Packet Core ("EPC") network that is operated based on a Third Generation Partnership ("3GPP") wireless communication standard. The RAN may include one or base stations 360 (which may take the form of evolved NodeBs ("eNBs")), via which UE 105 may communicate with the EPC network. The EPC network may include Serving Gateway ("SGW") 365, Mobility and Management Entity ("MME") 370, PDN Gateway ("PGW")/Service Capability Exposure Function ("SCEF") (hereinafter referred to as "PGW/SCEF") 375, and Policy Charging and Rules Function ("PCRF") 380.

Base station 360 may include one or more network devices that receive, process, and/or transmit traffic, such as calls, audio, video, text, and/or other data, destined for and/or received from UE 105. Base station 360 may receive traffic, destined for UE 105, from SGW 365, PGW/SCEF 375, and/or PDN 390, and may output the traffic to UE 105. Base station 360 may also receive traffic from UE 105, and may output the traffic to its intended destination via SGW 365, PGW/SCEF 375, and/or PDN 390.

SGW 365 may include one or more network devices that gather, process, search, store, and/or provide information in a manner described herein. SGW 365 may, for example, aggregate traffic received from one or more base stations 360, and may send the aggregated traffic to PDN 390 via PGW/SCEF 375.

MME 370 may include one or more computation and communication devices that perform operations to register UE 105 with the EPS, to establish bearer channels associated with a session with UE 105, to hand off UE 105 from the EPS to another network, to hand off UE 105 from the other network to the EPS, and/or to perform other operations. MME 370 may perform policing operations on traffic destined for and/or received from UE 105. MME 370 may, in some embodiments, receive messages via control plane signaling, which are destined to and/or sent from UE 105. In some embodiments, MME 370 may forward and/or generate control plane signaling, based on communications from EMDC 115 (e.g., in accordance with embodiments described herein), to UE 105.

PGW/SCEF 375 may include one or more network devices that gather, process, search, store, and/or provide information in a manner described herein. PGW/SCEF 375 may aggregate traffic received from one or more SGWs 365, etc. and may send the aggregated traffic to PDN 390. PGW/SCEF 375 may also, or alternatively, receive traffic from PDN 390 and may send the traffic toward UE 105 via base station 360 and/or SGW 365. PGW/SCEF 375 may receive notifications and/or instructions from EMDC 115, in accordance with some embodiments described herein, and may forward the notifications and/or instructions to MME 370.

PCRF 380 may include one or more devices that aggregate information to and from the EPC network and/or other sources. PCRF 380 may receive information regarding policies and/or subscriptions from one or more sources, such as subscriber databases and/or from one or more users (such as, for example, an administrator associated with PCRF 380).

HSS/AAA server 385 may include one or more devices that manage, update, and/or store, in a memory associated with HSS/AAA server 385, profile information associated with a subscriber. HSS/AAA server 385 may perform authentication, authorization, and/or accounting operations associated with the subscriber and/or a communication session with UE 105.

PDN 390 may include one or more wired and/or wireless networks. For example, PDN 390 may include an IP-based PDN, a WAN such as the Internet, a private enterprise network, and/or one or more other networks. UE 105 may communicate, through PDN 390, with data servers, other UEs 105, and/or to other servers or applications that are coupled to PDN 390. PDN 390 may be connected to one or more other networks, such as a PSTN, a PLMN, and/or another network. PDN 390 may be connected to one or more devices, such as content providers, applications, web servers, and/or other devices, with which UE 105 may communicate.

Figure 4:
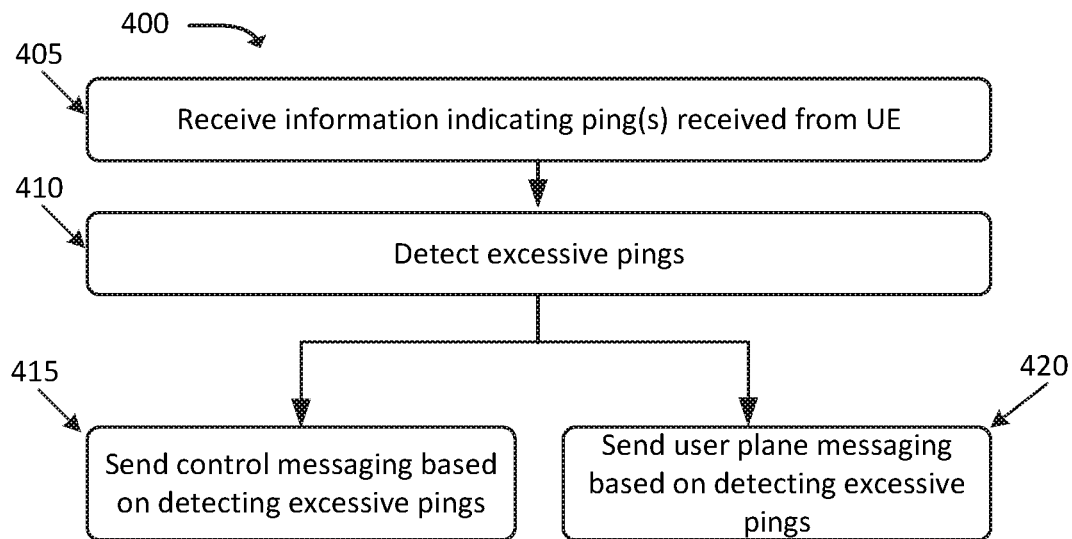
FIG. 4 illustrates an example process for automatically detecting excessive pings from a UE and instructing the UE to remediate the excessive pings, in accordance with some embodiments.

FIG. 4 illustrates a process 400 for detecting and remediating excessive pings from a particular UE 105 by requesting that UE 105 take remedial measures. In some embodiments, some or all of process 400 may be performed by EMDC 115, and/or by one or more other devices or systems.

As shown, process 400 may include receiving (at 405) information indicating that one or more pings were received from UE 105. A ping may include control plane messaging, such as paging messages, keep-alive messages, connection requests, RRC messages, and/or similar communications. Additionally, or alternatively, a ping may include user plane messaging, such as IP packets. EMDC 115 may receive information regarding the pings from AMF 315, SMF 320, SGW 365, PGW/SCEF 375, and/or one or more other devices or systems that receive pings from AMF 315.

Process 400 may also include detecting excessive pings (at 410). For example, EMDC 115 may detect excessive pings based on factors such as a quantity of pings (e.g., within a rolling time window, such as the quantity of pings within the last minute, the last hour, the last week, etc.), an amount of time between pings, a current amount of load or congestion associated with wireless telecommunications network 110, and/or other factors. EMDC 115 may, for instance, determine that the pings from UE 105 are excessive when the quantity of pings from UE 105 exceed a predetermined threshold (e.g., greater than 20 pings in one minute, greater than 100 pings in one hour, or some other threshold).

As discussed above, in some embodiments, the threshold may be dynamic, varying with current network congestion and/or other factors. For example, when the wireless telecommunications network is relatively congested, the threshold for excessive pings may be lower, while the threshold may increase if the network is relatively uncongested. In order to detect the network congestion, AMF 315 may request and/or receive information from one or more network devices that monitor the network and/or otherwise are capable of determining the level of network load or congestion (e.g., AMF 315, MME 370, and/or some other suitable device and/or system. As referred to herein, "congestion" may, in some embodiments, refer to radio frequency ("RF") congestion (e.g., which may be caused by a relatively large quantity of UEs 105 connected to, or attempting to connect to, RAN 310 and/or base station 360), traffic congestion (e.g., which may be caused by a relatively large amount of traffic being sent and/or received via the network, which may be detected by UPF 335, PGW/SCEF 375, and/or some other suitable device and/or system).

As noted above, for instance, when congestion is relatively high, the threshold for detecting "excessive" pings may be reduced, compared to when congestion is relatively low. In this manner, UEs 105 may be permitted to output more pings when congestion is relatively low, since the impact to the network of the more pings may be lower than when the congestion of the network is relatively high, and resources (e.g., RF physical resource blocks ("PRBs"), processing resources, etc.) may be more scarce when the congestion of the network is relatively high.

In some embodiments, the threshold may be adjusted based on one or more other factors, such as time of day, day of week, month, season, and/or other temporal factors. For instance, the threshold may be lower during daytime hours Monday through Friday, and may be higher during evening hours and/or during Saturday and Sunday. For example, EMDC 115 (and/or some other device and/or system) may determine that a higher threshold during daytime hours Monday through Friday may negatively impact network performance (e.g., may allow congestion to exceed a threshold level), while a lower threshold during daytime hours Monday through Friday may positively impact network performance (e.g., may reduce congestion, and/or may be correlated with congestion not exceeding the threshold level).

In some embodiments, different types of messages may be weighted differently when detecting excessive pings. For example, a first type of message (e.g., a paging message) may be weighted more heavily than a second type of message (e.g., a user plane message, which may include application layer data such as emails, instant messages, sensor readings (e.g., when UE 105 is an IOT device), or the like). For instance, assume that a paging message is associated with a weight of 2, and that a user plane message is associated with a weight of 1. Further assume that a given threshold for "excessive" messages is three (after applying the weights) messages in one minute.

Assume, in a first example, that UE 105 outputs two paging messages in one minute. With the weight applied, UE 105 may be considered as having sent four messages in one minute (i.e., $M_w = M*w = 2*2 = 4$, where $M_w$ is a weighted quantity of messages sent by UE 105, M represents the quantity of messages sent by UE 105, and w represents the weight for a given type of message). In this example, since $M_w > T_w$ (where $T_w$ represents the weighted threshold, which is 3 in this example), EMDC 115 may determine that UE 105 has exceeded the threshold quantity of pings and has thus outputted excessive pings over a given time period.

Assume, in a second example, that UE 105 outputs one paging message and one user plane message in one minute. With the weight applied, UE 105 may be considered as having sent three messages in one minute (i.e., $M_w = M_1*w_1 + M_2*w_2 = 2*1 + 1*1 = 3$, where $M_1$ represents the quantity of the first type of messages (paging messages, in this example) sent by UE 105, $w_1$ represents the weight for the first type of message, $M_2$ represents the quantity of the second type of messages (user plane messages, in this example) sent by UE 105, and $w_2$ represents the weight for the second type of message). In this example, since $M_w$ is not greater than $T_w$, EMDC 115 may determine that UE 105 has not exceeded the threshold quantity of pings and has thus has not outputted excessive pings over a given time period.

To determine the "type" of messages, EMDC 115 may receive header information, metadata, and/or other types of information from one or more devices that receive and/or process the messages (e.g., AMF 315, UPF 335, MME 370, PGW/SCEF 375, and/or some other suitable device and/or system). That is, these other devices that receive and/or process the messages may provide an indication of the type of message (e.g., may explicitly notify EMDC 115 of the type of message), and/or may provide information to EMDC 115 that allows EMDC 115 to determine the type of message (e.g., may provide header information from the message, metadata that includes information about the message (e.g., timestamp, indication of message type, etc.), a summary/digest of messages, etc.).

Process 400 may also include sending one or more notifications or other messages to UE 105. As discussed above, the notification may indicate that UE 105 has sent excessive pings, and/or may include an instruction or command for UE 105 to decrease the number of pings, increase the timing between pings, shut down, restart, and/or perform some other remedial measure.

As mentioned above, EMDC 115 may determine different remedial measures and/or different types of notifications based on the types of detected pings. For example, if the excessive pings include at least a threshold quantity or proportion of paging messages or connection requests (e.g., RRC requests), EMDC 115 may determine that a request to shut down and restart should be sent to UE 105. As another example, if the excessive pings include at least a threshold quantity or proportion of user plane messages (e.g., in a scenario where UE 105 is sending rapid bursts of information, such as sensor readings and/or other types of data associated with IOT devices), EMDC 115 may determine that a request to buffer user plane messages and output the messages on a less frequent basis should be sent to UE 105.

EMDC 115 may output (at 415) the notification, request, and/or other message through wireless telecommunications network 110 as a control plane message (e.g., as part of an RRC message and/or some other type of control plane message). For example, EMDC 115 may notify AMF 315, MME 370 (e.g., via NEF 350 or PGW/SCEF 375, respectively), and/or some other device or system, that the notification or request (e.g., as discussed above) should be included in control plane messaging to UE 105. In some embodiments, the control plane messaging may be provided to UE 105 through a paging response message, an RRC message, and/or some other suitable message.

In some embodiments, EMDC 115 may output (at 420) the notification or request via an external network (e.g., DN 355 or PDN 390) as a user plane message. The message may be sent as, for example, an SMS message, a Multimedia Service ("MMS") message, an email, an OTT message, an instant message, IP messaging, and/or some other suitable message.

Additionally, or alternatively, one or more other devices or systems may be notified (at 415 and/or 420) that excessive pings were detected from UE 105. For instance, EMDC 115 may output a notification, indicating that excessive pings were detected from UE 105, to an administrator and/or other entity associated with the wireless telecommunications network.

In some embodiments, EMDC 115 may send (at 415) a control plane message before sending (at 420) a user plane message. In some embodiments, EMDC 115 may send a user plane message before sending a control plane message.

In some embodiments, EMDC 115 may send a control plane message and a user plane message simultaneously. In some embodiments EMDC 115 may not send a user plane message, and may send only one or more control plane messages. In some embodiments, EMDC 115 may not send a control plane message, and may send only one or more user plane messages. In some embodiments, EMDC 115 may send multiple control plane messages and/or multiple user plane messages. In some embodiments, EMDC 115 may first use one type of messaging (e.g., control plane messaging or user plane messaging), monitor the pings from UE 105 for a certain duration of time, and then use another type of messaging (e.g., user plane messaging or control plane messaging) if UE 105 still outputs excessive pings after the first messaging was used.

Figure 5:
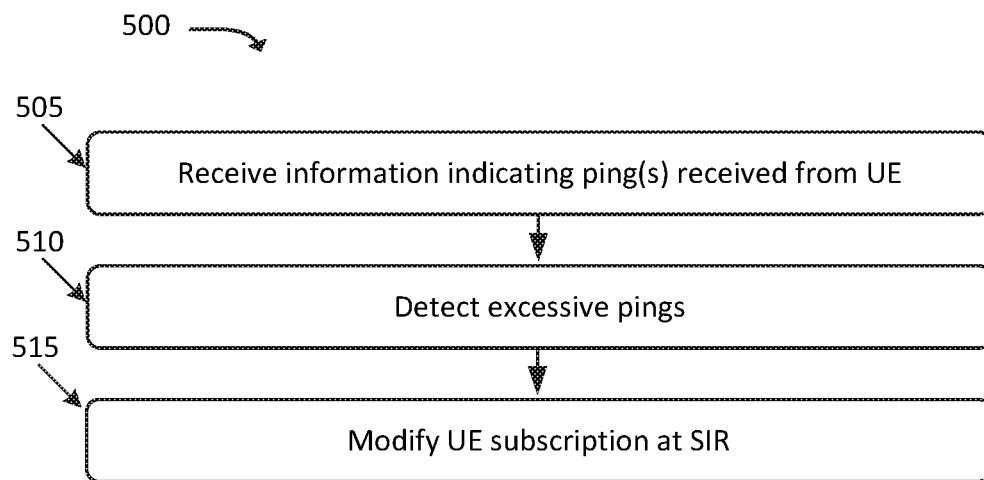
FIG. 5 illustrates an example process for a network-side remediation of excessive pings from a UE.

FIG. 5 illustrates an example process 500 for detecting and remediating excessive pings from a particular UE 105 by modifying access to the network. In some embodiments, process 500 may be performed after one or more messages are sent to UE 105 (e.g., according to blocks 415 and/or 420), monitoring pings from UE 105, and determining that UE 105 still outputs excessive pings after the one or more messages were sent to UE 105. In some embodiments, process 500 may be performed independently of whether any messages were sent to UE 105, requesting that UE 105 reduce ping activity. In some embodiments, some or all of process 500 may be performed by EMDC 115 and/or one or more other devices and/or systems. Certain portions of FIG. 5 are similar to portions of FIG. 4, discussed above. These portions are not described again in detail, for the purpose of brevity.

Process 500 may include receiving (at 505) information indicating that one or more pings have been received from UE 105. As mentioned above, pings may include paging messages, keep-alive messages, OTT messages, and/or other communications.

Process 500 may further include detecting (at 510) excessive pings from UE 105. As discussed above, EMDC 115 may detect excessive pings from UE 105 based on factors such as a quantity of pings (e.g., within a rolling time window, such as the quantity of pings within the last minute, the last hour, the last week, etc.), an amount of time between pings, a current amount of load or congestion associated with wireless telecommunications network 110, and/or other factors.

Process 500 may include modifying access of UE 105 by modifying (at 515) subscription information, associated with UE 105, at a SIR. For example, EMDC 115 may send a notification, command, or instruction to a SIR (e.g., UDM 340 and/or HSS/AAA server 385). The notification may include, for example, instructions to suspend the subscription, terminate the subscription, limit the subscription's access to a limited period of the day, add a flag to the subscription information, and/or otherwise modify the subscription.

As similarly discussed above, EMDC 115 may send different instructions based on different factors. For instance, if the excessive pings include at least a threshold quantity or proportion of a first type of ping (e.g., excessive paging messages, excessive RRC messages, etc.), then EMDC 115 may send an instruction of a first type (e.g., refuse connection requests from UE 105, forgo responding to paging messages from UE 105, etc.), while if the excessive pings include at least a threshold quantity or proportion of a different second type of ping (e.g., excessive OTT messages, etc.), then EMDC 115 may send an instruction of a second type (e.g., place a limit on data transfer speed or amount of data that can be sent to and/or received by UE 105, etc.).

As another example, the manner in which excessive pings were detected may cause different types of instructions to be sent to the SIR. For example, if EMDC 115 detected (at 510) excessive pings every morning from 9-LOAM from UE 105, then EMDC 115 may instruct the SIR to disable the ability of UE 105 to access the network between 9-LOAM, or some other suitable instruction that is based on the particular pattern of excessive pings detected by EMDC 115.

As mentioned above, the instruction from EMDC 115 may cause a flag to be placed on a subscriber profile associated with UE 105. In some embodiments, the notification from EMDC 115 may not include a flag (or an instruction to place a flag), and the SIR may place the flag on the subscriber profile based on the receipt of the notification from EMDC 115 (e.g., without an explicit instruction from EMDC 115). The SIR may modify the subscriber profile and/or the access of UE 105 based on these flags. For example, if at least a threshold quantity of flags have accumulated on the subscriber profile within a given time window, then the SIR may revoke access to the network, for UE 105, for a particular period of time. In some embodiments, this period of time may escalate after access has been revoked. In some embodiments, the threshold quantity of flags may change (e.g., may be reduced) when access has been revoked based on flags that have been placed on the subscriber profile. For example, access for a given UE 105 may first be revoked for 6 hours after 10 flags have accumulated over the course of one day, and then the access for UE 105 may be revoked for 12 hours after 5 flags have accumulated over the course of a subsequent day.

In some embodiments, the thresholds for whether to take remedial measures based on the flags may be adjusted based on network congestion or load, in a similar manner as discussed above. For example, if wireless telecommunications network 110 is relatively congested (e.g., a measure of network load is relatively high), then the threshold for the frequency of flags may be lower. If, on the other hand, wireless telecommunications network 110 is relatively uncongested (e.g., a measure of network load is relatively low), then the threshold for the frequency of flags may be higher.

In further embodiments, SIR 220 may limit the quantity of flags placed on the subscription information during a certain time period. For example, if EMDC 115 sends multiple notifications with instructions to add flags to the subscriber profile for a given UE 105 in a given time window, the SIR may place a maximum quantity of flags for the given time window to the subscriber profile. For example, if EMDC 115 sends 100 notifications in one minute, the SIR may place one flag to represent that one or more notifications were received in that one minute (e.g., in lieu of placing 100 flags).

Figure 6:
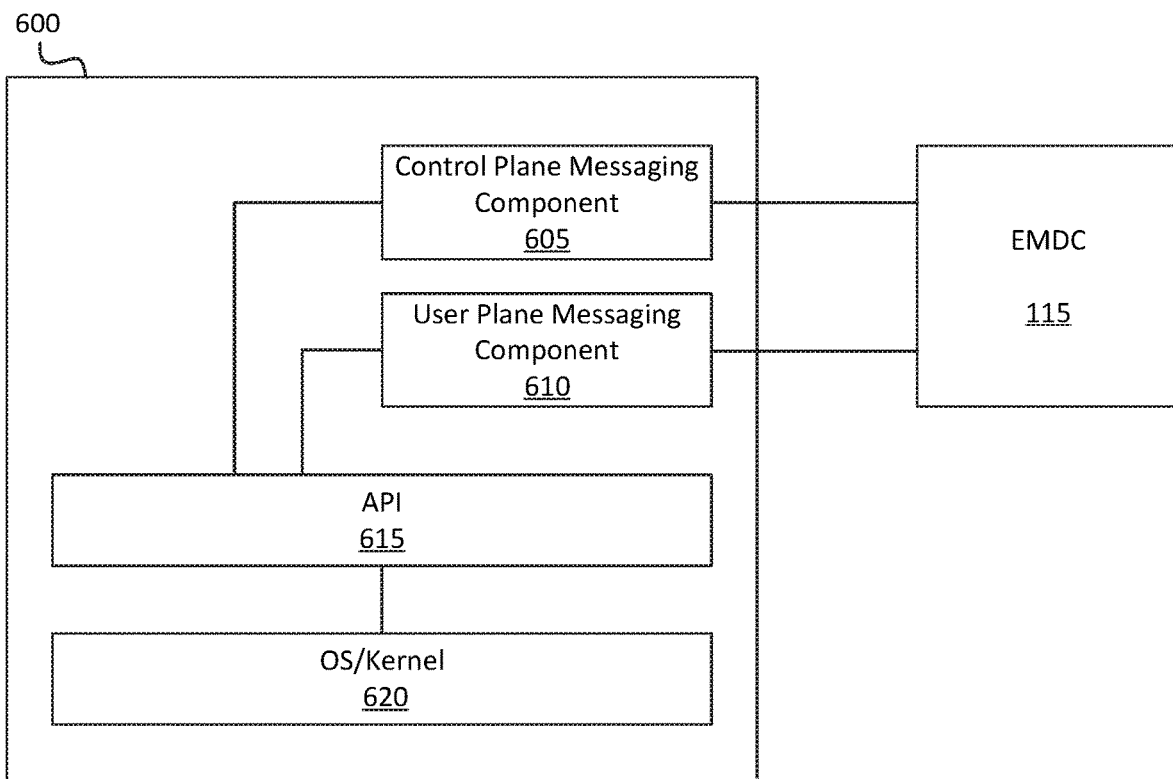
FIG. 6 illustrates example functional components of a UE, in accordance with some embodiments.

FIG. 6 illustrates an example device 600, which may be a particular UE 105, and/or may represent components of a particular UE. As shown, device 600 may include control plane messaging component 605, user plane messaging component 605, application programming interface ("API") 615, and operating system ("OS")/kernel 620. In practice, device 600 may include additional, fewer, and/or different components. In some embodiments, some or all of the components shown may be implemented via hardware circuitry. In some embodiments, some or all of the components shown may be implemented via software logic in conjunction with hardware circuitry.

Device 600 may receive one or more messages from EMDC 115 via control plane messaging component 605 and/or user plane messaging component 605. While not shown in this figure, other devices, systems, or networks may be present in the signal path between EMDC 115 and device 600. Control plane messaging component 605 may receive a control plane message, which may originate from (or may include information that originates from) EMDC 115, in accordance with embodiments described above. Briefly, the message may indicate remedial measures to take based on excessive pings detected by EMDC 115, and/or may include an alert that device 600 has outputted excessive pings in a given timeframe. The control plane messaging may be included in, for example, an RRC message and/or some other type of control plane message. As discussed above, the message may include any command or notification, including a notification that device 600 is sending excessive pings and/or an instruction to mitigate the excessive pings.

Control plane messaging component 605 may relay the notification to OS/kernel 620 (e.g., via API 615), and/or may determine a remedial action to take based on the notification and instruct OS/kernel 620 according to the determined remedial action. For example, the notification may include an instruction to restart device 600, and/or control plane messaging component 605 may determine (based on the notification from EMDC 115) that device 600 should be restarted. Accordingly, control plane messaging component 605 may provide an instruction to OS/kernel 620, via API 615, to restart.

Similarly, device 600 may communicate, using user plane messaging, with EMDC 115 via user plane messaging component 605. This message may include instructions to take particular remedial measures, and/or may indicate that device 600 outputted excessive pings over a given time period. user plane messaging component 605 may relay the notification to OS/kernel 620 (e.g., via API 615), and/or may determine a remedial action to take based on the notification and instruct OS/kernel 620 according to the determined remedial action. For example, the notification may include an instruction to restart device 600, and/or user plane messaging component 605 may determine (based on the notification from EMDC 115) that device 600 should be restarted. Accordingly, user plane messaging component 605 may provide an instruction to OS/kernel 620, via API 615, to restart.

Figure 7:
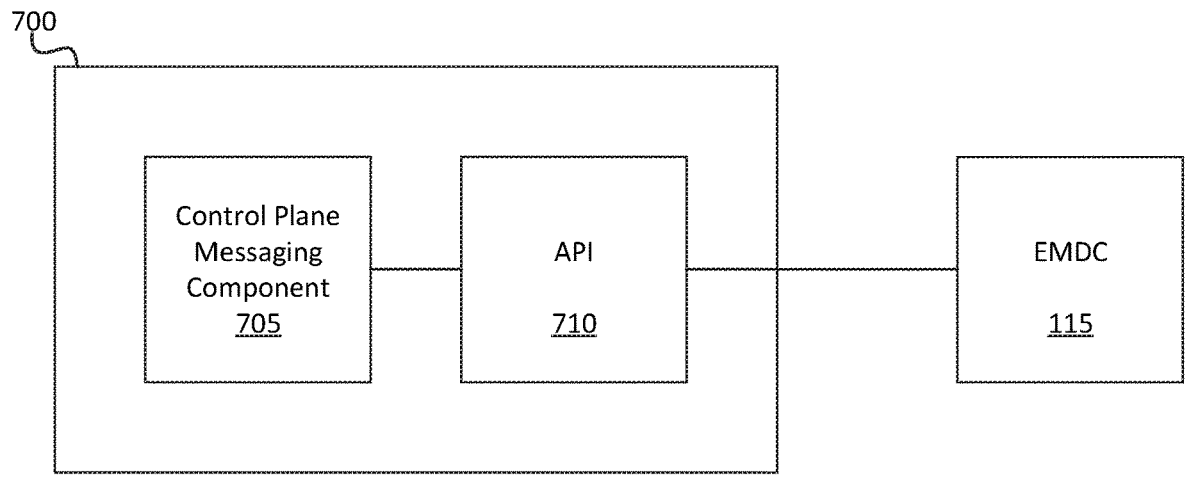
FIG. 7 illustrates example functional components of a first network device (e.g., a Mobility Management Entity ("MIME") and/or an Access and Mobility Management Function ("AMF")), in accordance with some embodiments.

FIG. 7 illustrates example components of device 700. Device 700 may include, and/or may represent components of, AMF 315, MME 370, and/or some other device that provides control messages to UE 105. As shown, device 700 may include control plane messaging component 705 and API 710. In practice, device 700 may include additional, fewer, and/or different components. In some embodiments, some or all of the components shown may be implemented via hardware circuitry. In some embodiments, some or all of the components shown may be implemented via software logic in conjunction with hardware circuitry.

Control plane messaging component 705 may communicate with UE 105 (e.g., to send and/or receive control messages). Control plane messaging component 705 may receive (e.g., via API 710) notifications and/or instructions based on EMDC 115 detecting excessive pings from UE 105 (e.g., as discussed above), and may provide notifications and/or instructions in accordance with embodiments described above. Briefly, these notifications or instructions may cause UE 105 to perform one or more remedial measures, such as restarting, suspending operation for an amount of time, buffering messages, etc.

Figure 8:
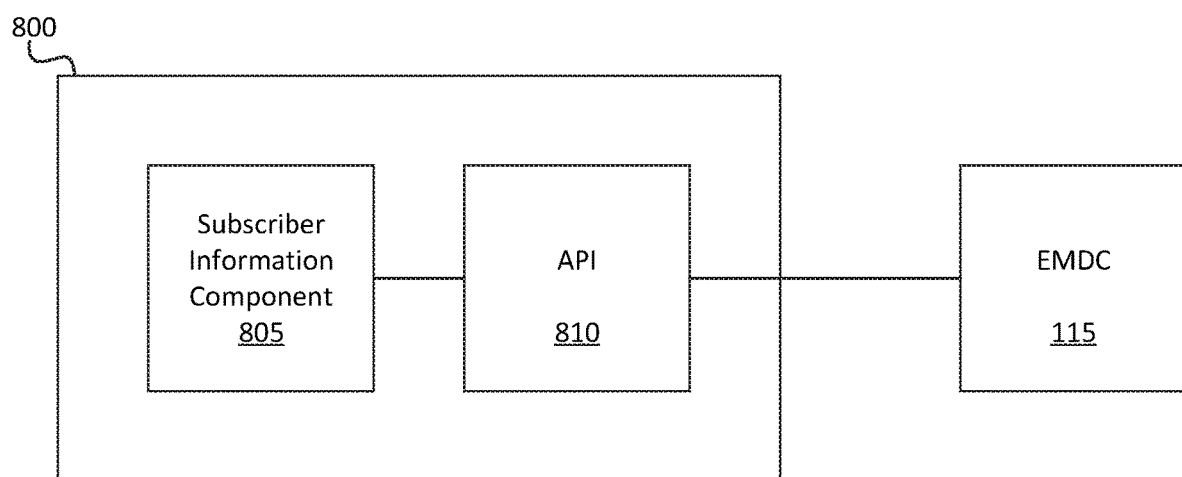
FIG. 8 illustrates example functional components of a second network device (e.g., a Home Subscriber Server ("HSS") and/or a Unified Data Management ("UDM") device), in accordance with some embodiments.

FIG. 8 illustrates example components of device 800. Device 800 may include, and/or may represent components of a SIR, such as UDM 340, HSS/AAA server, and/or some other device or system that stores subscriber information for a wireless telecommunications network. As shown, device 800 may include subscriber information component 805 and API 810. In practice, device 800 may include additional, fewer, and/or different components. In some embodiments, some or all of the components shown may be implemented via hardware circuitry. In some embodiments, some or all of the components shown may be implemented via software logic in conjunction with hardware circuitry.

Subscriber information component 805 may store subscriber information, which may include information regarding access of UE 105 to the network, such as whether the UE 105 is authorized to access the network and/or a manner in which UE 105 is authorized to access the network (e.g., data transfer amount limits, data transfer speed limits, voice minute limits, time periods during which UE 105 is permitted to access the network, etc.). subscriber information component 805 may receive (e.g., via API 810) notifications and/or alerts from EMDC 115. As discussed above, the notification and/or alert may include an instruction to modify the subscription information for UE 105. For example, the notification may request the addition of a flag to the subscriber profile for UE 105 and/or an instruction to suspend the subscription of UE 105. As discussed above, subscriber information component 805 may place a flag on subscription information for UE 105 independently of whether EMDC 115 requested a flag to be placed.

Figure 9:
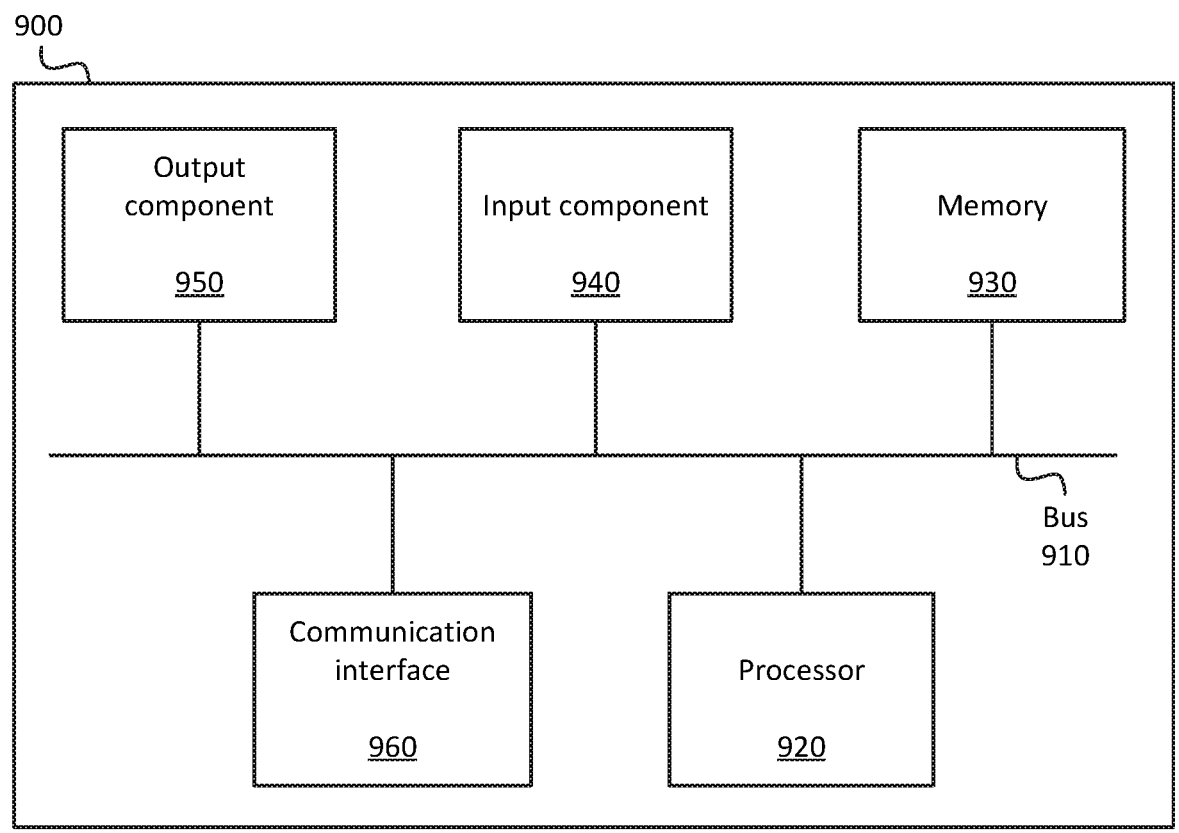
FIG. 9 illustrates example components of one or more devices, according to one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4 and 5, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that, the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
 a non-transitory computer-readable medium storing a set of processor-executable instructions; and
 one or more processors configured to execute the set of processor-executable instructions, wherein executing the set of processor-executable instructions causes the one or more processors to:
  detect that a first plurality of messages have been outputted by a user equipment ("UE") to a wireless telecommunications network;
  determine that the first plurality of messages exceed one or more thresholds;
  output, based on determining that the first plurality of messages exceed the one or more thresholds, an alert to the UE, indicating that the first plurality of messages exceed the one or more thresholds;
  monitor a second plurality of messages, outputted by the UE after the alert was outputted to the UE;
  determine that the second plurality of messages exceed the one or more thresholds; and
  modify access, of the UE, to the wireless telecommunications network based on determining that the second plurality of messages exceed the one or more thresholds after the alert has been outputted to the UE.

2. The device of claim 1, wherein executing the processor-executable instructions, to determine that the first plurality of messages exceed the one or more thresholds, causes the one or more processors to:
  determine that a quantity of messages, outputted by the UE over a particular period of time, exceed a particular threshold quantity of messages.

3. The device of claim 1, wherein executing the processor-executable instructions, to determine that the first plurality of messages exceed the one or more thresholds, causes the one or more processors to:
  determine that an average frequency of at least some of the first plurality of messages exceeds a threshold average frequency.

4. The device of claim 1, wherein executing the processor-executable instructions, to modify access, of the UE, to the wireless telecommunications network, causes the one or more processors to:
  output an instruction to a network device associated with the wireless telecommunications network to modify subscription information associated with the UE.

5. The device of claim 4, wherein executing the processor-executable instructions, to output the instruction to the network device, causes the one or more processors to:
  output the instruction to a Home Subscriber Server ("HSS") associated with the wireless telecommunications network, or
  output the instruction to a Unified Data Management ("UDM") associated with the wireless telecommunications network.

6. The device of claim 1, wherein executing the processor-executable instructions, to output the alert to the UE, causes the one or more processors to:
  output the alert via control plane messaging.

7. The device of claim 1, wherein executing the processor-executable instructions, to modify access, of the UE, to the wireless telecommunications network, causes the one or more processors to modify a maximum data transfer speed associated with the UE.

8. A non-transitory computer-readable medium, storing a set of processor-executable instructions, which, when executed by one or more processors, cause the one or more processors to:
  detect that a first plurality of messages have been outputted by a user equipment ("UE") to a wireless telecommunications network;
  determine that the first plurality of messages exceed one or more thresholds; and
  output, based on determining that the first plurality of messages exceed the one or more thresholds, an alert to the UE, indicating that the first plurality of messages exceed the one or more thresholds;
  monitor a second plurality of messages, outputted by the UE after the alert was outputted to the UE;
  determine that the second plurality of messages exceed the one or more thresholds; and
  modify access, of the UE, to the wireless telecommunications network based on determining that the second plurality of messages exceed the one or more thresholds after the alert has been outputted to the UE.

9. The non-transitory computer-readable medium of claim 8, wherein the processor-executable instructions, to determine that the first plurality of messages exceed the one or more thresholds, include processor-executable instructions to:
  determine that a quantity of messages, outputted by the UE over a particular period of time, exceed a particular threshold quantity of messages.

10. The non-transitory computer-readable medium of claim 8, wherein the processor-executable instructions, to determine that the first plurality of messages exceed the one or more thresholds, include processor-executable instructions to:
  determine that an average frequency of at least some of the plurality of messages exceeds a threshold average frequency.

11. The non-transitory computer-readable medium of claim 8, wherein the processor-executable instructions, to modify access, of the UE, to the wireless telecommunications network, include processor-executable instructions to:
  output an instruction to a network device associated with the wireless telecommunications network to modify subscription information associated with the UE.

12. The non-transitory computer-readable medium of claim 11, wherein the processor-executable instructions, to output the instruction to the network device, include processor-executable instructions to:
  output the instruction to a Home Subscriber Server ("HSS") associated with the wireless telecommunications network, or
  output the instruction to a Unified Data Management ("UDM") associated with the wireless telecommunications network.

13. The non-transitory computer-readable medium of claim 8, wherein the processor-executable instructions, to output the alert to the UE, include processor-executable instructions to:
  output the alert via control plane messaging.

14. The non-transitory computer-readable medium of claim 8, wherein the processor-executable instructions, to modify access, of the UE, to the wireless telecommunications network, include processor-executable instructions to modify a maximum data transfer speed associated with the UE.

15. A method, comprising:
  detecting, by a network device of a wireless telecommunications network, that a first plurality of messages have been outputted by a user equipment ("UE");
  determining, by the network device, that the first plurality of messages exceed one or more thresholds;
  outputting, based on determining that the first plurality of messages exceed the one or more thresholds, an alert to the UE, indicating that the first plurality of messages exceed the one or more thresholds;
  monitoring a second plurality of messages, outputted by the UE after the alert was outputted to the UE;
  determining that the second plurality of messages exceed the one or more thresholds; and
  modifying access, of the UE, to the wireless telecommunications network based on determining that the second plurality of messages exceed the one or more thresholds after the alert has been outputted to the UE.

16. The method of claim 15, wherein determining that the first plurality of messages exceed the one or more thresholds includes:
  determining that a quantity of messages, outputted by the UE over a particular period of time, exceed a particular threshold quantity of messages.

17. The method of claim 15, wherein determining that the first plurality of messages exceed the one or more thresholds includes:

determining, by the network device, that an average frequency of at least some of the plurality of messages exceeds a threshold average frequency.

18. The method of claim 15, wherein modifying access, of the UE, to the wireless telecommunications network, includes outputting an instruction to at least one of:
   a Home Subscriber Server ("HSS") associated with the wireless telecommunications network, or
   a Unified Data Management ("UDM") associated with the wireless telecommunications network.

19. The method of claim 15, wherein outputting the alert to the UE includes:
   outputting the alert via control plane messaging.

20. The method of claim 15, wherein modifying access, of the UE, to the wireless telecommunications network includes modifying a maximum data transfer speed associated with the UE.

\* \* \* \* \*